United States Patent [19]
Bone, III

[11] 3,737,037
[45] June 5, 1973

[54] DRILLING FLUID TREATMENT
[75] Inventor: Lee Bone, III, Richardson, Tex.
[73] Assignee: Atlantic Richfield Company, New York, N.Y.
[22] Filed: May 3, 1971
[21] Appl. No.: 139,416

[52] U.S. Cl. .......................... 210/73, 175/66, 210/54
[51] Int. Cl. ............................................. E21b 21/04
[58] Field of Search ..................... 210/73, 54; 175/66

[56] References Cited
UNITED STATES PATENTS
3,433,312  3/1969  Burdyn et al. ....................... 175/66
2,870,990  1/1959  Bergey ................................ 175/66
3,016,962  1/1962  Lummus et al. ..................... 175/66

*Primary Examiner*—Michael Rogers
*Attorney*—Blucher S. Tharp and Roderick W. MacDonald

[57] ABSTRACT

A method for treating well drilling fluid to remove substantially all suspended solid particles wherein the drilling fluid is centrifuged to remove particles of sizes down to about 20 microns in diameter followed by adding a flocculating agent to form flocs of particles from about 20 microns to less than 2 microns in diameter, and filtering the flocs from the drilling fluid to provide a liquid substantially free of suspended solid particles for reuse as a drilling fluid.

5 Claims, 2 Drawing Figures

PRIOR ART

Patented June 5, 1973

3,737,037

INVENTOR:
LEE BONE III

Roderick W. MacDonald

ATTORNEY

DRILLING FLUID TREATMENT

BACKGROUND OF THE INVENTION

Heretofore suspended solids have been removed from a drilling fluid utilizing mechanical decanting centrifuges such as the "Sharples Super-D-Canter". Such a procedure is disclosed in U.S. Pat. No. 2,870,990, the disclosure of which is incorporated herein by reference.

In the prior art procedures weighting materials such as barite, which are purposely added to the drilling fluid to give it substantially increased weight to counteract elevated downhole pressure, is first removed by the use of a mechanical decanting centrifuge. It is desirable to remove the weighting material separately from other less dense suspended solids so that the weighting material can be reused in other drilling fluid. The thus treated drilling fluid is then subjected to a second mechanical decanting centrifuge to remove solid particles larger than 2 microns in diameter. It is taught in the prior art that a centrifuge which will remove particles down to 2 microns in diameter must develop a centrifugal force of at least 2,100 times the force of gravity and that centrifuges which develop less than 2,100 times the force of gravity are not satisfactory because the effluent from such a centrifuge will contain a quantity of suspended solids which prevents reuse of the effluent as a drilling fluid.

Thus, the prior art teaches the necessity of removing suspended solids down to 2 microns in diameter which necessity requires the use of a mechanical centrifuge.

A mechanical centrifuge which will remove suspended solids down to 2 microns in diameter of necessity is very large, expensive, operates on a low throughput of drilling fluid, and has low efficiency as regards solids separation.

For work in the field around a drilling rig it is desirable not to be tied down to large expensive low efficiency mechanical centrifuges.

It is also taught in the prior art, Oil and Gas Journal, May 25, 1970, p. 65, that suspended solids in drilling fluid adversely affect the drilling rate which adds to drilling time and cost, increases drilling fluid viscosity, increases pump pressure and wear, increases fuel consumption, increases bit wear, and the like. Thus, it is desirable to come as close as possible to removing all suspended solids, even those with a diameter of less than 2 microns.

SUMMARY OF THE INVENTION

According to this invention, the necessity for large, expensive mechanical centrifuges which will remove solid particles down to 2 microns in diameter is eliminated without eliminating the function of such a centrifuge and even with an improvement in results in that particles smaller than 2 microns are also removed. This is accomplished by centrifuging the drilling fluid to remove solid particles of sizes down to about 20 microns in diameter and thereafter adding to the thus centrifuged drilling fluid at least one flocculating agent in an amount effective to form flocs of substantially all remaining solid particles of sizes from about 20 microns to less than 2 microns in diameter, and filtering the flocs from the drilling fluid whereby substantially all of the liquid portion, including any dissolved chemicals, is retained for reuse and is in a physical state such that it is substantially free of suspended solids including suspended solids of a diameter smaller than 2 microns.

By removing solid particles no smaller than about 20 microns by way of centrifuging the need for a large expensive mechanical centrifuge such as a decanting centrifuge is eliminated and nonmechanical centrifuges such as cyclone separators can be substituted which are not as large nor as expensive as mechanical centrifuges which develop at least 2,100 times the force of gravity. The nonmechanical centrifuges can process a higher throughput of drilling fluid liquid with higher efficiency than such mechanical centrifuges. In addition, a large portion of the solids separation function is transferred from centrifuging to flocculation which is carried out chemically in a pit or tank and requires no bulky equipment like mechanical centrifuges.

Accordingly, not only is the requirement for mechanical centrifuges eliminated and replaced with much smaller less expensive equipment such as cyclone separators and flocculation tanks, but also the overall results of solids removal is substantially improved in that solid particles smaller than 2 microns are also removed.

Accordingly, it is an object of this invention to provide a new and improved method for treating well drilling fluid. It is another object to provide a new and improved method for separating suspended solids from a well drilling fluid to an extent such that the liquid portion of the well drilling fluid is suitable for reuse as such. It is another object to provide a new and improved method for separating suspended solid particles from a well drilling fluid so that the only waste is solid particles as opposed to liquid which are more easily disposed of in the environment without polluting same.

Other aspects, objects, and advantages of this invention will be apparent to those skilled in the art from this disclosure and the appended claims.

DETAILED DESCRIPTION OF THE INVENTION

Figure 1:
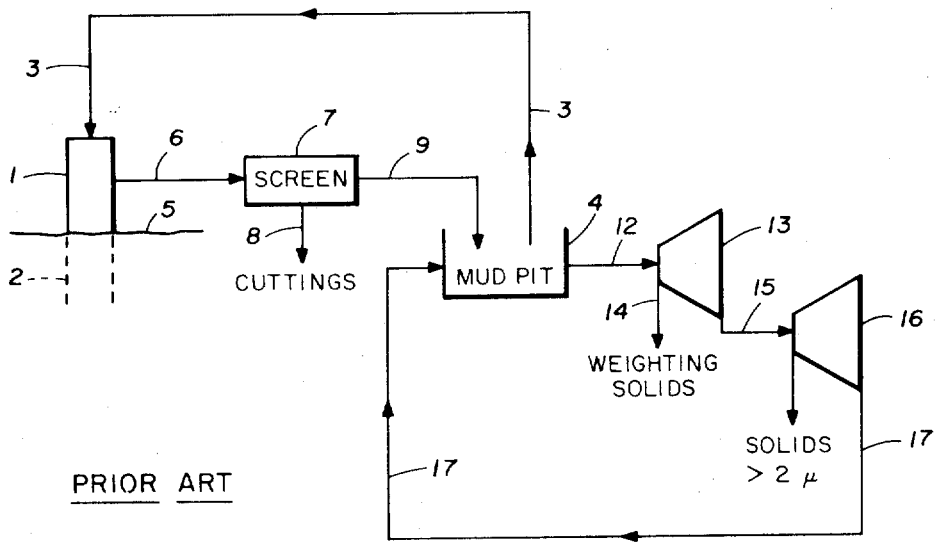
FIG. 1 shows a flow scheme according to the prior art.

More specifically, FIG. 1 shows a wellhead 1 which is in communication with a wellbore 2 extending down into the earth. Other drilling equipment normally associated with wellhead 1 is not shown for sake of brevity but is well-known in the art as shown by U.S. Pat. No. 2,870,990. Drilling fluid is pumped into the wellbore by way of pipe 3 from one or more drilling fluid (oftentimes referred to as mud or drilling mud) storage pits 4.

The drilling fluid entering wellhead 1 passes down into wellbore 2 through drill pipe (not shown), exits through the drill bit at the bottom of the wellbore, and returns to the earth's surface 5 by way of the annulus between the exterior of the drill pipe and the interior of the wellbore. When the returning drilling fluid reaches wellhead 1 it is removed therefrom by way of pipe 6. Pipe 6 carries the drilling fluid to a shale shaker or screening means 7 which separates the large cuttings (rock and other earth material cut loose by the bit and carried to the surface by the drilling fluid) from the drilling fluid. The cuttings are removed from the system as waste by way of pipe 8 and the drilling fluid which still contains suspended solids from about 1 inch in diameter down to submicron diameters is passed by way of pipe 9 to a mud pit 4.

In this invention a particle size is referred to as its diameter. The term "diameter" is meant to also apply to particles which are not generally spherical and in such a situation to refer to the largest cross-sectional dimension of the nonspherical particle.

Drilling fluid from one or more mud pits 4 is removed for treatment by way of pipe 12.

Depending upon the pressures encountered by gases, liquids, and the like entering wellbore 2 from the earth, a drilling fluid may or may not need a weighting material added thereto to counteract the wellbore pressure and to keep this pressure from blowing the drilling fluid out the top of the wellhead. Thus, if low pressure is encountered in wellbore 2 the drilling fluid may be an unweighted fluid which means that no weighting material has been added thereto. However, if high pressure is encountered in wellbore 2 the drilling fluid most likely will be a weighted fluid. The weighting material employed is normally quite dense and therefore has a density substantially greater than any of the other solids suspended in the drilling fluid including small cuttings.

When a drilling fluid is weighted, it is desirable to separate the expensive weighting material out from the drilling fluid separately so that it can be added to other drilling fluid and therefore reused in the system.

Figure 2:
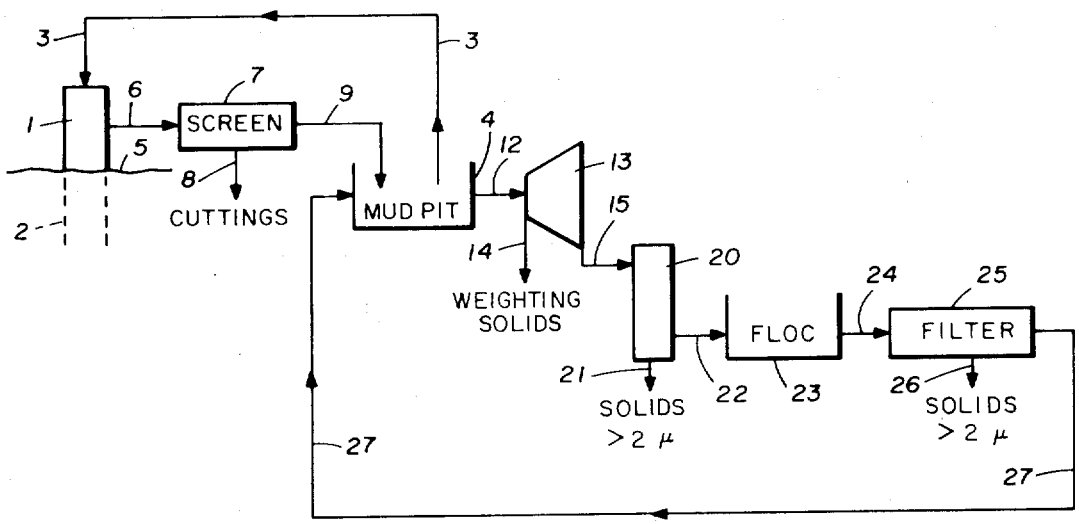
FiG. 2 shows a flow scheme in accordance with this invention.

FIGS. 1 and 2 both show a treatment system for weighted drilling fluid. It should be noted that if the drilling fluid to be treated is not weighted the separate centrifugation step for removing weighting solids will be eliminated for this invention applys to weighted or unweighted systems.

In FIG. 1 pipe 12 carries the drilling fluid to a conventional mechanical centrifuge 13 such as a decanting centrifuge whereby, by mechanical means, the drilling fluid is subjected to forces substantially greater than gravitational force so that the weighting solids migrate out of the drilling fluid and are removed as a substantially dry particular solid stream by way of pipe 14.

The thus treated drilling fluid then passes from mechanical centrifuge 13 by way of pipe 15 to a second mechanical centrifuge such as the "Sharples Super-D-Canter" which develops at least 2,100 times the force of gravity to remove solid particles down to but not below 2 microns in diameter. The liquid effluent from mechanical centrifuge 16 is then passed by way of pipe 17 back to mud pit 4.

FIG. 2 shows substantially the same process steps as FIG. 1 for a weighted drilling fluid down to pipe 15. However, the mechanical centrifuge 16 of FIG. 1 is eliminated in the invention of FIG. 2. Instead there is employed a nonmechanical cyclone centrifuge 20 which is merely a spiral conduit which imposes nowhere near 2,100 times the force of gravity on the drilling fluid being treated but which will separate out solid particles down to 20 microns in diameter. These particles are removed by way of pipe 21.

The drilling fluid still containing suspended solids smaller than 20 microns in diameter is passed by way of pipe 22 to a tank 23 in which one or more flocculating agents are mixed with the drilling fluid and the mixture allowed to remain until flocs of substantial size are formed from the suspended solid particles of diameter smaller than 20 microns.

Thereafter, the drilling fluid containing flocs of solid particles passes by way of pipe 24 to a filter 25 wherein the flocs are filtered from the liquid and removed by way of pipe 26.

The remaining liquid drilling fluid which is now substantially free of suspended solids including solids having a diameter smaller than 2 microns is passed by way of pipe 27 back to mud pit 4 for reuse as drilling fluid liquid.

One or more of a very large number of known flocculating agents can be employed. Such known flocculating agents include polyacrylates; polyacrylamides; polyamines; polyamides; partially hydrolyzed polyacrylamides; methylcellulose; carboxymethylcellulose; alkali metal carboxymethylcellulose; halides of aluminum, iron, nickel, and cobalt; aluminum sulfate; alkali metal aluminate; alum; bentonite; attapulgite; sepiolite; hydrous mica; and kaolin. Since these flocculating agents are known and commercially available further discussion thereof is, for the sake of brevity, omitted.

The amount of flocculating agent or agents added to the drilling fluid will vary widely depending upon the agents themselves and the particular composition of the drilling fluid but will generally be an amount effective to form flocs of substantially all remaining solid particles of sizes of from about 20 microns to less than 2 microns in diameter. It is preferable that the amount of flocculating agent added be sufficient to form flocs that will be retained on a 200 mesh sieve (Tyler Sieve Series). Generally, from about 0.01 parts per million to about 5 weight percent based on the total weight of the drilling fluid of one or more flocculating agents can be added.

After the addition of the flocculating agent or agents stirring for mixing can be employed if desired. The formation of the flocs is then allowed to carry on under ambient conditions of temperature and pressure for a desired time such as at least about 5 minutes.

Filtering of the flocs from the drilling fluid can be carried out in any desired manner such as filtering with conventional screens or sieves, filtering through a sand bed, diatomaceous earth bed, and the like.

This invention is applicable to any known drilling fluid be it water base or oil base, whether it contains weighting agent or not, and having dissolved or disperse therein various chemicals and additives such as viscosifiers, fluid loss control agents, emulsifiers, thinners, and the like.

Example

A process is carried out using the apparatus substantially as shown in FIG. 2 wherein the drilling fluid is composed of diesel oil having added thereto, based on the weight of the diesel oil, 5 weight percent barite, 3 weight percent attapulgite clay, and 1 weight percent fatty acid emulsifier.

The drilling fluid recovered from wellhead 1 by way of pipe 6 has cuttings which have a particle diameter greater than one-eighth inch removed by screen 7. Drilling fluid removed from mud pit 4 by way of pipe 12 contains as suspended solid particles-cuttings of a diameter smaller than one-eighth inch, barite particles varying from minus 20 mesh (Tyler Sieve Series) to less than 2 microns and attapulgite particles in the same particle size range as the barite. The drilling fluid is passed through a decanting centrifuge 13 from which substantially only barite particles are separated by way of pipe 14 and the effluent from centrifuge 13 passes by way of pipe 15 to a cyclone separator 20. Solid particles of attapulgite, cuttings, and some barite, are separated by way of pipe 21, these cuttings varying from slightly smaller than one-eighth inch in diameter to 20 microns.

The liquid effluent from cyclone 20 passes to floc tank 23 to which is added 1 weight percent, based on the weight of the liquid effluent, of partially hydrolyzed polyacrylamide as disclosed in U.S. Pat. No. 3,463,730, the disclosure of which is incorporated herein by reference. The mixture of drilling fluid and partially hydrolyzed polyacrylamide is held at ambient conditions of temperature and pressure for 15 minutes after which it is passed through a sand bed filter 25 in which flocs of solid particles varying from 20 microns to less than 2 microns in particle size diameter are removed leaving substantially solids free liquid for return to mud pit 4.

Reasonable variations and modifications are possible within the scope of this disclosure without departing from the spirit and scope of this invention.

The embodiments of the invention in which an exclusive property or privilege is claimed are defined as follows:

1. In a method for treating well drilling fluid containing suspended solid particles in a wide range of particle sizes down to less than 2 microns in diameter, the improvement comprising centrifuging said drilling fluid to remove any weighting agent present, thereafter centrifuging said drilling fluid with a nonmechanical centrifuge to remove remaining solid particles of sizes down to about 20 microns in diameter, adding at least one flocculating agent to the thus centrifuged drilling fluid in an amount effective to form flocs of substantially all remaining solid particles of sizes from about 20 microns to less than 2 microns in diameter, and filtering said flocs from said drilling fluid whereby substantially all of the liquid portion including any dissolved chemicals is retained for reuse and is substantially free of suspended solids.

2. A method according to claim 1 wherein said centrifuging to remove weighting material is accomplished with a mechanical decanting centrifuge, and said centrifuging to remove less dense particles is accomplished with a nonmechanical cyclone centrifuge.

3. A method according to claim 1 wherein said at least one flocculating agent is selected from the group polyacrylates; polyacrylamides; polyamines; polyamides; partially hydrolyzed polyacrylamides; methylcellulose; carboxymethylcellulose; alkali metal carboxymethylcellulose; halides of aluminum, iron, nickel, and cobalt; aluminum sulfate; alkali metal aluminate; alum; bentonite; attapulgite; sepiolite; hydrous mica; and kaolin.

4. A method according to claim 1 wherein said at least one flocculating agent is added to said drilling fluid in an amount sufficient to form flocs that will be retained on a 200 mesh sieve.

5. A method according to claim 1 wherein said at least one flocculating agent is added to said drilling fluid in an amount of from about 0.01 ppm to about 5 weight percent based on the total weight of the drilling fluid.

* * * * *